United States Patent Office 2,946,461
Patented July 26, 1960

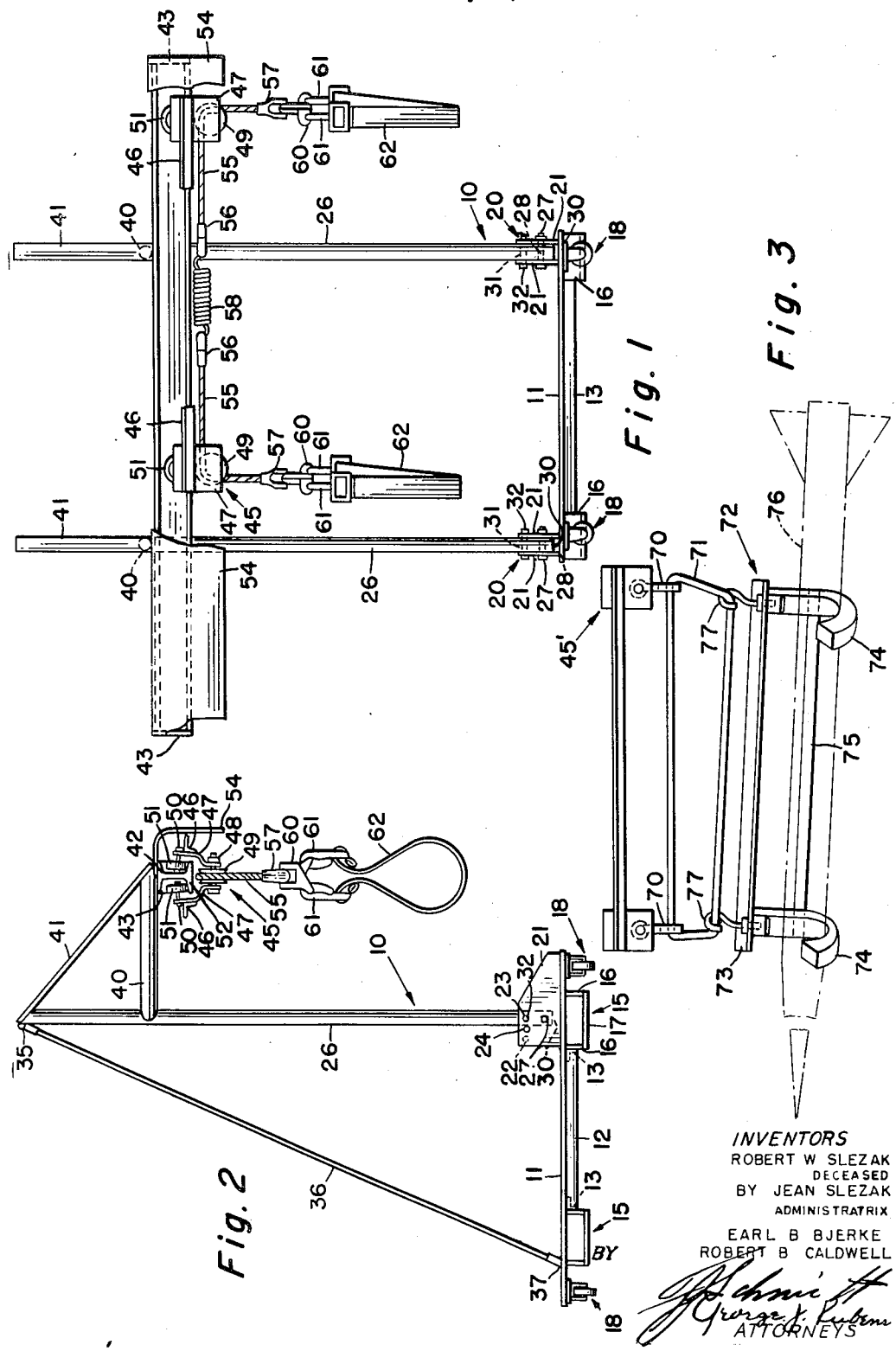

2,946,461

MISSILE LOADING APPARATUS

Robert W. Slezak, deceased, late of Oxnard, Calif., by Jean Slezak, administratrix, and Earl B. Bjerke, Oxnard, Calif., and Robert B. Caldwell, Honolulu County, Hawaii, assignors to the United States of America as represented by the Secretary of the Navy Filed May 28, 1957, Ser. No. 662,304

5 Claims. (Cl. 212—135)

(Granted under Title 35, U.S. Code (1952), sec. 266)

The invention described herein may be manufactured and used by or for the Government of the United States of America for governmental purposes without the payment of any royalties thereon or therefor.

The present invention relates to article handling apparatus and more particularly to such an apparatus especially adapted for handling operations wherein it is necessary to accurately manipulate a large unwieldly object into an unusual position.

The invention device may be utilized in any application wherein it is necessary to accurately position a large and unwieldy object, however it is especially adapted for use in loading guided missiles on the folded wings of carrier-type aircraft. In applications where space is at a minimum such as on aircraft carriers, aircraft may be stored with the wings thereof in folded position and it thereby becomes desirable to load articles such as guided missiles on the wings of aircraft while in folded position. Carrier-type aircraft are provided with an accurately machined track on the lower surface of the wing which is adapted to receive a similar machined sled connected to a guided missile. The accurate machining of the track and the sled require that they be carefully and accurately aligned in order to install the missile in the loaded position on the wing of the aircraft.

When the wings of the aircraft are in folded position, the track on the lower surface of the wing is elevated quite a distance above the deck or ground and is in a tilted position such that it is extremely difficult to properly position the missile such that it may be secured in loaded position. The task of loading missiles on the wings of aircraft when the wings are in folded position is accordingly very difficult when performed without the benefit of special equipment, and in consequence thereof, the present invention has been developed to solve this specific problem.

No previous equipment has been designed for the purpose of loading missiles on the folded wings of aircraft, and the loading of missiles on the wings has been performed in the past with the wings in lowered operating position. This prior method of installation requires the services of at least four men to properly position the missile prior to sliding the sled of the missile onto the track on the wing and to further maintain proper alignment while installing the missile into loaded position. It is evident that the necessity of lowering and spreading the wings of an aircraft prior to installation of missiles on the wings thereof is disadvantageous where space is at a premium since much greater space is required when the loading is performed in such a manner. A further disadvantage lies in the fact that when the wings are in spread position the loading crew are required to work in stooped position below the wings thereby reducing the efficiency and speed of installation.

The present invention utilizes an arrangement wherein the missile to be loaded is suspended by a resilient member such that the missile may be easily tilted into proper position for loading by one man. The amount of effort required to adjust the position of the missile is reduced to a minimum thereby enabling one man to efficiently load a missile on the wing of an aircraft while such wing is in folded position.

An object of the present invention is the provision of a new and novel article handling apparatus wherein a missile or the like may be accurately positioned for loading on the folded wings of an aircraft.

Another object is to provide an article handling apparatus which reduces the number of men and the effort required to load a missile on an aircraft to a minimum.

A further object is the provision of an article handling apparatus which is simple and inexpensive in construction yet sturdy and efficient in operation.

Other objects and many attendant advantages of this invention will be readily appreciated as the same becomes better understood by reference to the following detailed description when considered in connection with the accompanying drawings wherein:

Fig. 1 is a front view of a preferred embodiment of the invention;

Fig. 2 is a side view of the device shown in Fig. 1;

Fig. 3 is a front view of a modification of the device schematically illustrating a missile in position for loading in the cradle of the device.

Referring now to the drawings wherein like reference characters designate similar parts throughout the views, there is shown in Fig. 1 a frame means generally indicated by reference numeral 10 including a rectangular flattened base plate 11 having two spaced angle members 12 suitably secured as by welding to the lower surface thereof, only one of said members being visible in Fig. 2, and two spaced angular members 13 also suitably secured as by welding to the lower surface thereof, members 13 being disposed at right angles to members 12 and only one of members 13 being visible in Fig. 1. Angular members 12 and 13 are provided for the purpose of increasing the bending strength of base plate member 11.

Four symmetrically disposed channel members 15 are secured to the lower surface of base plate 11 adjacent the four corners thereof, each of the channel members comprising two downwardly extending plates 16 welded to the lower surface of the base plate and a horizontally extending plate 17 welded to the lower surface of each of plates 16. The aligned channel members at opposite sides of the frame are adapted to receive the fingers of a conventional fork lift truck whereby the entire frame assembly may be lifted or lowered as desired.

Base plate 11 is also provided with four conventional caster assemblies 18 suitably secured as by means of bolts to the four corners thereof whereby the frame may be manually rolled into position prior to mounting the frame upon the fingers of a fork lift truck.

Two similar support assemblies 20 are each composed of a pair of spaced plates 21 suitably secured as by welding to upper surface of base plate 11. A bar 22 is welded between the plates 21 at the rear portion thereof as seen in Fig. 2, and each of plates 21 is also provided with a pair of openings 23 and 24 for a purpose hereinafter described.

Two upwardly extending tubular shafts 26 are provided with radial openings therethrough at the lower end thereof and a bolt 27 which is rotatably suspended between the pairs of plates 21 of each of support assemblies 20 passes through an opening 28 in the lower end of tubular members 26 whereby it is apparent that members 26 are pivotally supported by support assemblies 20. It should be noted that the lower end 30 of each of tubular members 26 is above the upper surface of plate 11 whereby the tubular members may be pivoted about bolts 27. An opening 31 is formed radially through each of members 26 and is adapted to be aligned with either opening 23 or 24 in plates 21 such that a suitable pin 32 may be inserted through the aligned openings to maintain the tubular members in proper position.

The uper ends of each of tubular members 26 is provided with a fitting 35 adapted to be secured to one end of a cable 36, the opposite ends of each of the cables being secured to a similar fitting 37 secured to the upper surface of base plate 11. It is evident that cable 36 prevents rotation of tubular members 26 clockwise about bolts 27 as seen in Fig. 2.

A horizontally extending tubular member 40 is secured as by welding to each of tubular members 26 and the outer ends of members 26 and 40 are tapered in such a manner that they may be connected by flattened plates 41 which are welded to the tapered ends of each of the associated tubular members 26 and 40. An I beam 42 is welded to the lower surface of tubular members 40 and is provided with end plates 43 which are welded to each end thereof. One end plate has been removed in Fig. 2 for the sake of clarity.

A carriage means indicated generally by reference numeral 45 comprises a pair of angular members 46 disposed on opposite sides of I beam 42, each of members 46 having a downwardly extended curved plate 47 welded to opposite ends thereof. Each pair of adjacent plates 47 are connected by means of a bolt 48 which rotatably supports a pulley 49 thereon. Each plate 47 is also provided at the upper end thereof with a bolt 50 which rotatably supports a roller 51 which is positioned on one of the lower rails 52 formed by the I beam 42. It is evident that the entire carriage assembly 45 is supported by rollers 51 from I beam 42 and that the entire carriage assembly is free to move longitudinally along the I beam between end plates 43 thereof. The sloping rails 52 of I beam 42 and the corresponding slope of rollers 51 prevent lateral motion of the carriage assembly relative to the I beam guide means. An angular sheet metal guard 54 is welded at the uper side to I beam 42 for the entire length thereof, the lower side of guard 54 extending below carriage 45 to prevent accidental injury to the fingers of the operator.

A cable 55 passes over each of pulleys 49 and a clevis 56 is provided at one end at each of cables 55. A similar clevis 57 is secured to the opposite end of each of the cable members. Clevises 56 of the two cables are connected by a tension spring 58 the size and characteristics of each may be chosen in accordance with well-known design considerations.

Each of clevises 57 is connected to a dual fitting 60 each of which in turn supports a pair of snaps 61, such as used for example in parachute harnesses. A strap 62 is supported between each pair of snaps 61 and each of straps 62 is adapted to receive an intermediate portion of the missile. It is evident that the structure including 61 and straps 62 provide an adjustable cradle means whereby a missile may be supported from the device and secured in such position such that there is no danger of the missile accidentally slipping therefrom.

The heart of the invention lies in the arrangement wherein the two cradle means, in this case straps 62, are each connected to opposite ends of resilient spring member 58. It is evident that when a missile is suported by the cradle means, spring 58 is placed under tension and supports the entire weight of the missilie. In this condition, the missile will feel substantially weightless to a person attempting to adjust the position of the missile, and accordingly it is extremely easy to tilt either end of the missile up or down since the resilient member will permit such movement with a minimum of effort in the construction as disclosed herein.

Fig. 3, illustrates a modification of the device wherein carriage 45' is similar in all respects to carriage 45 shown in Figs. 1 and 2 with the exception that pulleys 49 are replaced by guide members such as eye bolts 70. A continuous resilient member 71 such as a conventional aircraft bungee passes through bolts 70 and is suspended therefrom. A cradle means indicated generally by reference numeral 72 includes a cross bar 73 having downwardly extended hook shaped members 74 secured thereto. A second cross bar 75 is connected between the lower portions of hook members 74 to provide additional strength. A missile indicated schematically by phantom line 76 is shown in position within the cradle. The upper surface of cross bar 73 is provided with a pair of smaller hook members 77 each of which is supported by resilient member 71.

The analogy between the structure shown in Fig. 3 and that shown in Figs. 1 and 2 should be noted since they operate on the same principle. As in the device shown in Figs. 1 and 2, the cradle members of the device shown in Fig. 3 are connected by means of hook members 74 to spaced portions of the resilient member whereby the entire weight of the missile is supported by the resilient member. In this manner, a missile supported within the cradle of the device shown in Fig. 3 will also feel substantially weightless and may accordingly be easily tilted into position for loading as shown in Fig. 3.

It is apparent from the foregoing that there is provided a new and novel article handling apparatus wherein a missile or the like may be accurately positioned for loading on the folded wings of an aircraft employing the services of a minimum number of personnel since the invention device may be operated by a single member. The device is simple and inexpensive in construction, and yet is sturdy and efficient in operation.

Obviously many modifications and variations of the present invention are possible in the light of the above teachings. It is therefore to be understood that within the scope of the appended claims the invention may be practiced otherwise than as specifically described.

What is claimed is:

1. Article handling apparatus for aligning an unwieldy elongate article to be secured to a support which comprises a frame having rail means, a carriage movably supported on said rail means, said carriage having spaced guide means lying in a vertical plane, a resilient elongate means having depending portions freely running through and supported by said guide means, said elongate means being movable around said guide means in the same direction alternately to raise and lower the respective depending portions, cradle means attached to said depending portions of the elongate means for suspending the article substantially in said vertical plane at spaced locations, the entire length of said resilient means always being under tension, whereby the suspended article will feel substantially weightless when one end is tilted during alignment of the article to the support.

2. The apparatus of claim 1 wherein said elongate means is a flexible cable having an intermediate section consisting of a tension spring positioned between the spaced guide means on the carriage and the cradle means comprises a pair of spaced straps.

3. The apparatus of claim 1 wherein the depending portions of said elongate means are connected together to form a continuous endless resilient cord.

4. The apparatus of claim 3 wherein said cord runs freely through eyes at spaced ends of both the carriage and the cradle means at the place of attachment.

5. Missile handling apparatus for aligning a missile to an elevated launcher rail, which comprises a portable frame having slots for engagement by the tines of a fork lift, said means mounted to the frame, a carriage movably supported on said rail means, said carriage having spacer guide means lying in a vertical plane, a resilient elongate means having depending portions freely running through and supported by said guide means, said elongate means being movable around said guide means alternately to raise and lower the respective depending portions, cradle means attached to said depending portions of the elongate means for suspending the missile substantially in said vertical plane at correspondingly spaced locations, the entire length of said resilient means being under tension when the missile is suspended in the cradle means, whereby the suspended missile will feel substantially weightless when one end is tilted during alignment of the missile to the launcher rail.

References Cited in the file of this patent

UNITED STATES PATENTS

| | | |
|---|---|---|
| 174,455 | Thomas | Mar. 7, 1876 |
| 430,642 | Hale | June 24, 1890 |
| 1,296,814 | Knutson | Mar. 11, 1919 |
| 1,320,740 | Coghlin | Nov. 4, 1919 |
| 1,536,766 | Cammann | May 5, 1925 |
| 2,400,299 | Jones | May 14, 1946 |
| 2,695,779 | Brandt | Nov. 30, 1954 |
| 2,820,561 | Meagher | Jan. 21, 1958 |